(12) United States Patent
Morris et al.

(10) Patent No.: US 9,460,140 B2
(45) Date of Patent: Oct. 4, 2016

(54) AUTOMATED LIBRARIAN AS CONTRIBUTOR TO A COLLECTION OF CONTENT

(71) Applicant: Microsoft Technology Licensing, LLC, Redmond, WA (US)

(72) Inventors: Katrika Morris, Issaquah, WA (US); Lauren Javor, Seattle, WA (US); Kami Neumiller, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 475 days.

(21) Appl. No.: 13/872,165

(22) Filed: Apr. 29, 2013

(65) Prior Publication Data

US 2014/0324913 A1    Oct. 30, 2014

(51) Int. Cl.
*G06F 17/30*    (2006.01)

(52) U.S. Cl.
CPC ... *G06F 17/30345* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 6,108,686 A | | 8/2000 | Williams |
| 6,671,682 B1* | | 12/2003 | Nolte et al. |
| 7,133,879 B1* | | 11/2006 | Goldsmith et al. |
| 2005/0278312 A1* | | 12/2005 | Plow et al. ............... 707/3 |
| 2006/0271352 A1* | | 11/2006 | Nikitin et al. ............. 704/9 |
| 2007/0220552 A1* | | 9/2007 | Juster ............... H04N 21/4825 725/46 |
| 2008/0168135 A1 | | 7/2008 | Redlich et al. |
| 2008/0195629 A1 | | 8/2008 | Kim et al. |
| 2009/0006369 A1* | | 1/2009 | Guday et al. .............. 707/5 |
| 2009/0094208 A1* | | 4/2009 | Marvit et al. ............. 707/3 |
| 2010/0049862 A1* | | 2/2010 | Dixon ..................... 709/231 |
| 2011/0043652 A1 | | 2/2011 | King et al. |
| 2011/0153605 A1 | | 6/2011 | Silverman |
| 2011/0202827 A1 | | 8/2011 | Freishtat et al. |
| 2013/0171609 A1* | | 7/2013 | Le Chevalier et al. ...... 434/365 |

OTHER PUBLICATIONS

Response to the International Search Report and Written Opinion for PCT/US2014/035764 dated Nov. 24, 2014, 9 pages.
Second Written Opinion for International Application No. PCT/US2014/035764, date of mailing: May 27, 2015, date of filing: Apr. 29, 2014, 6 pages.
International Search Report and Written Opinion from International Application No. PCT/US2014/035764, Date of Mailing: Aug. 27, 2014, Date of Filing: Apr. 29, 2014, 10 pages.
Innes Martin et al: "Fetch: A Personalized Information Retrieval Tool", Retrieved at <<http://http://www.dcs.gla.ac.uk/~jj/publications/conference/2004/martin-riao04.pdf>> Retrieved date: Aug. 18, 2014, 15 pages.
Lingling Zhang et al: "An Intelligent Interface Agent for Web-based Information Retrieval", Proceedings 1999 IEEE Workshop on Internet Applications IEEE from Jul. 26, 1999, pp. 38-43 (6 pages).

(Continued)

*Primary Examiner* — Anh Tai Tran
(74) *Attorney, Agent, or Firm* — Jessica Myers; Tom Wong; Micky Minhas

(57) ABSTRACT

An automated researching component is invited to contribute content to a collection of research material. The automated research component can be set to continue to add content at a given pace, or for a given duration of time. The automatically added content is added to the collection, along with manually added content.

20 Claims, 17 Drawing Sheets

(56) References Cited

OTHER PUBLICATIONS

Hsieh-Chang Tu et al; "An Architecture and Category Knowledge for Intelligent Information Retrieval Agents", System Sciences, 1998., Proceedings of the Thirty-First Hawaii International Conference on Kohala Coast, HI, USA, vol. 4, Jan. 6, 1998, pp. 405-414 (10 pages).

PCT Chapter II Demand for International Application No. PCT/US2014/035764, International date of filing: Apr. 29, 2014, 8 pages.

"Zite under the Hood", Retrieved at <<http://blog.zite.com/2012/01/11/zite-under-the-hood/>> Jan. 11, 2012, pp. 5.

Corner, Matthew, "Tumblr: An Introduction Guide for Microblogging", Retrieved at <<http://www.1stwebdesigner.com/design/tumblr-introduction-guide-microblogging/>> Retrieved Date: Feb. 7, 2013, pp. 12.

"Curating Information as Content Strategy", Retrieved at <<http://www.conversationagent.com/2010/10/curating-information-as-content-strategy.html>> Retrieved Date: Feb. 7, 2013, pp. 3.

Sturdivant, James, "Content Aggregation: A Win-Win for Publishers", Retrieved at <<http://www.pubexec.com/article/content-aggregation-a-win-win-publishers-407201/1>> May 2009, pp. 3.

Barbierri, Cody, "HiveFire Unveils Web Content Aggregation and Distribution Tool Curata", Retrieved at <<ttp://venturebeat.com/2010/06/25/hivefire-curata/#6wLRr9gU533cAB5o.99>> Jun. 25, 2010, pp. 2.

International Preliminary Report on Patentability for International Application No. PCT/US2014/035764, date of mailing: Aug. 24, 2015; date of filing: Apr. 29, 2014, 14 pages.

\* cited by examiner

AUTOMATED LIBRARIAN AS CONTRIBUTOR TO A COLLECTION OF CONTENT

BACKGROUND

Computer systems are currently in wide use. They are deployed for use in a wide variety of environments. One environment is for performing on-line research.

Research is the process of obtaining information to become informed on any subject. For instance, research can be done for a school project or a work project. It can also be done to compare products in order to buy a given brand of product. Similarly, one can do research when planning a vacation or an event (such as a wedding or a birthday, etc.) or when simply following a personal interest or hobby. Research can even be used when looking for a good article or book to read or when trying to find a good restaurant. Performing on-line research in these and other areas can present some challenges.

Often, people doing research do not know exactly what they are looking for, particularly in the early stages of the research. It can be time consuming to find useful and accurate information that is relevant to a given topic. Information can also be biased. In addition, new sources of information are almost constantly becoming available, and it can be difficult to stay up-to-date with recent developments and publications in any given area. In addition, the depth and breadth of the research are also important things to consider. If the research has too narrow a focus, this can cause the researcher to miss important tangential discoveries. If the research is too broad in focus, it can lead to distractions and unnecessary diversions.

Even after the information is obtained through the research process, documenting and organizing the content can be time consuming and difficult. It may be that different arrangements or organizations of the same content may bring to light a variety of different information.

Some current systems provide recommendation engines that suggest content based on a user's past habits, searches, declared interests, or ratings. These types of recommendation engines are used on some on-line shopping sites as well as on-line multimedia ordering sites (such as a site where a song or movie or video can be ordered and streamed or downloaded for viewing). In addition, similar recommendation engines are used for recommending books, magazines, or other articles for reading.

Some collaborative environments also exist which provide social book marking sites. That is, a user can invite other people to help them collect content on a specific subject. Further, some services allow a user to outsource research to a third party. However, these services rely on remote human beings to accomplish the task, and they are quite limited in terms of their ability to provide personalized, accurate, thorough and ongoing research.

The discussion above is merely provided for general background information and is not intended to be used as an aid in determining the scope of the claimed subject matter.

SUMMARY

An automated researching component is invited to contribute content to a collection of research material. The automated research component can be set to continue to add content at a given pace, or for a given duration of time. The automatically added content is added to the collection, along with manually added content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
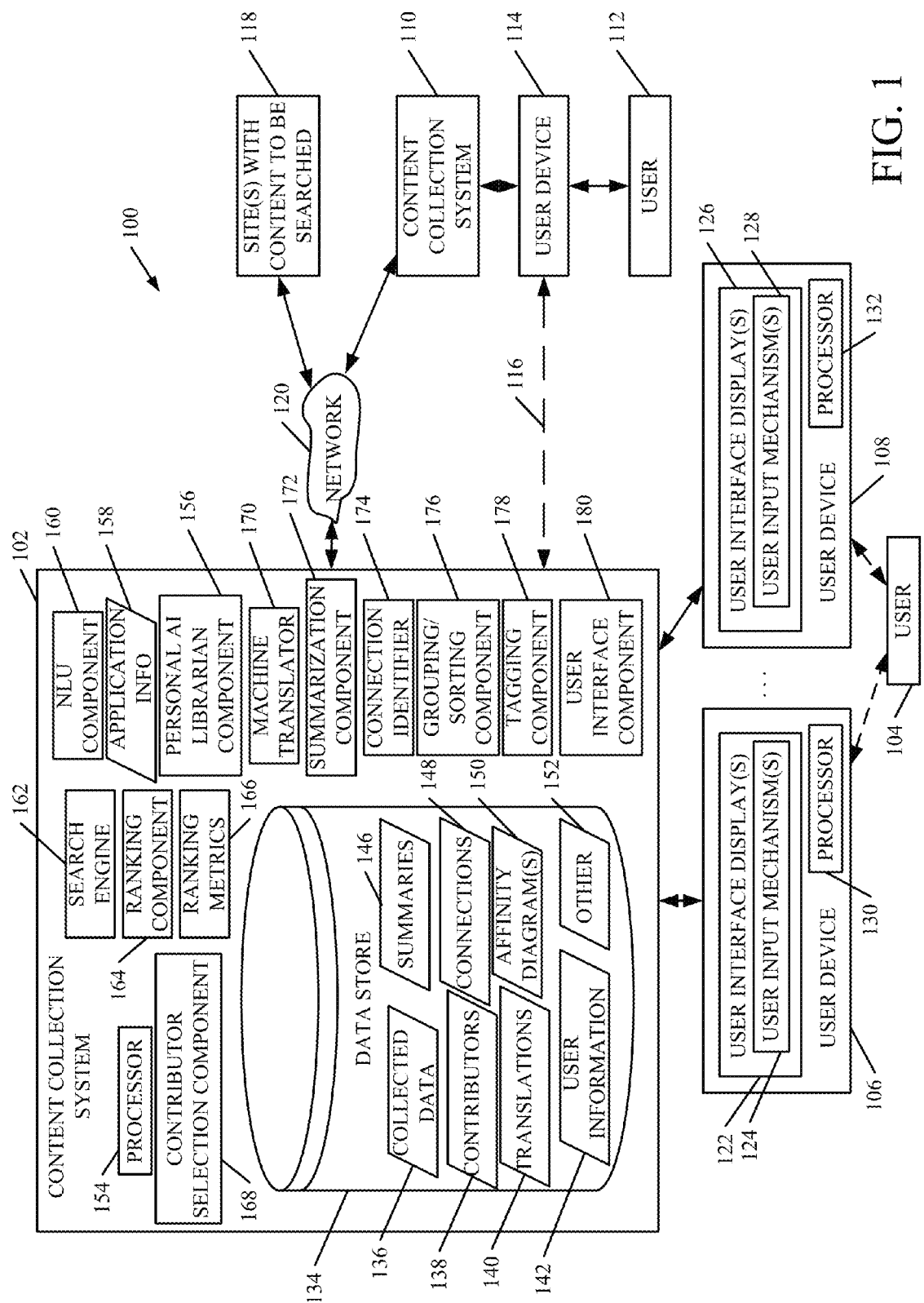
FIG. 1 is a block diagram of one embodiment of a research architecture.

FIG. 1 is a block diagram of one embodiment of a research architecture 100. Architecture 100 shows a content collection system 102 accessible by a user 104 using a plurality of different user devices 106 and 108. Architecture 100 also shows a second content collection system 110 that is accessible by user 112 through one or more user devices 114. Dashed arrow 116 also shows that, in one embodiment, both user 104 and user 112 (and possibly other users) can access the same content collection system 102 as well.

However, the present description will proceed primarily with respect to user 104 accessing content collection system 102 through one of user devices 106 or 108. In doing so, user 104 controls content collection system 102 to collect content from sites with content to be searched 118. This can illustratively be done over a network 120, which can be a wide area network, a local area network, or another type of network.

In the embodiment shown in FIG. 1, user device 106 generates user interface displays 122 with user input mechanisms 124 for interaction by user 104. User device 108 generates user interface displays 126 with user input mechanisms 128 for interaction by user 104. User 104 illustratively interacts with the user input mechanisms 124 or 128 in order to control and manipulate content collection system 102, as well as the specific user device on which the user input mechanisms are displayed.

The user input mechanisms 124 and 128 can take a wide variety of different forms. For instance, they can be links, buttons, icons, text boxes, dropdown menus, check boxes, or any other of a wide variety of different user input mechanisms. In addition, the user input mechanisms can be actuated in a wide variety of different ways as well. For instance, they can be actuated using a point and click device (such as a mouse or track ball), using a hard or soft keyboard or keypad, a thumb pad, buttons, joystick, etc. Similarly, where the particular user device on which the user input mechanisms 124 or 128 are displayed includes speech recognition components, the user input mechanisms can be actuated using speech commands. Similarly, where the user interface displays 122 or 126 are displayed on a touch sensitive screen, the user input mechanisms 124 and 128 can be actuated using touch gestures, such as with the user's finger, a stylus, or another mechanism.

Also, each user device 106 and 108 can illustratively include a processor 130 and 132, respectively. Processors 130 and 132 are illustratively a functional part of the user device on which they are deployed, and they are activated by various components on the user device to facilitate the functionality of the user device. It will also be noted that user device 114 can be similar to user device 106 or user device 108. However, it is shown in simplified form, for the sake of expedience.

Content collection system 102 illustratively includes data store 134. Data store 134 includes collected content 136, a set of contributors 138, translations 140, user information 142, summaries 146, connections 148, affinity diagrams 150, and other information 152. Content collection system 102 is also shown having processor 154, personal artificial intelligence (AI) library component 156, application information 158, natural language understanding (NLU) component 160, search engine 162, ranking component 164 that accesses ranking metrics 166, contributor selection component 168, machine translator 170, summarization component 172, connection identifier 174, grouping/sorting component 176, tagging component 178 and user interface component 180. Of course, system 102 can have fewer or other components as well.

Processor 154 is illustratively a computer processor with associated memory and timing circuitry (not separately shown). It is illustratively a functional part of content collection system 102 and is activated by, and facilitates the functionality of, other items in content collection system 102. In addition, while only a single processor 154 is shown, multiple processors can be used as well, and they can be located within system 102, or external to system 102.

Data store 134 is also shown as a single data store. It will be noted, however, that multiple different data stores can be used. They could be local to system 102, or remote from system 102, and accessible by system 102. Similarly, some can be local while others are remote.

In addition, FIG. 1 shows a number of different blocks with corresponding functionality. It will be noted that the functionality of two or more blocks can be combined into a single block, or the functionality can be divided into additional blocks as well. Those shown are for the sake of example only.

Prior to providing a more detailed discussion of the operation of architecture 100, a brief overview will be provided for the sake of clarity. In the embodiment discussed, user 104 wishes to begin a collection of content. User 104 can illustratively collect the content manually by searching through sites 118 (e.g., using search engine 162), and manually adding collected content 136 to data store 134. In addition, user 104 can invite other users (such as user 112) in a collaborative environment. In that case, other users can add content or data 136 to the collection as well. User 104 can also invite personal AI librarian component 156 to automatically add content. User 104 can illustratively determine the pace at which librarian component 156 adds content to the collected data 136, as well as the breadth of the content added by librarian component 156. Librarian component 156 can then use other items in content collection system 102 to perform operations on the content, such as to rank it, translate it, summarize it, identify connections to user 104 or identify conections within the content itself, group or sort the content, tag it, or display it in various ways.

Figure 2A:
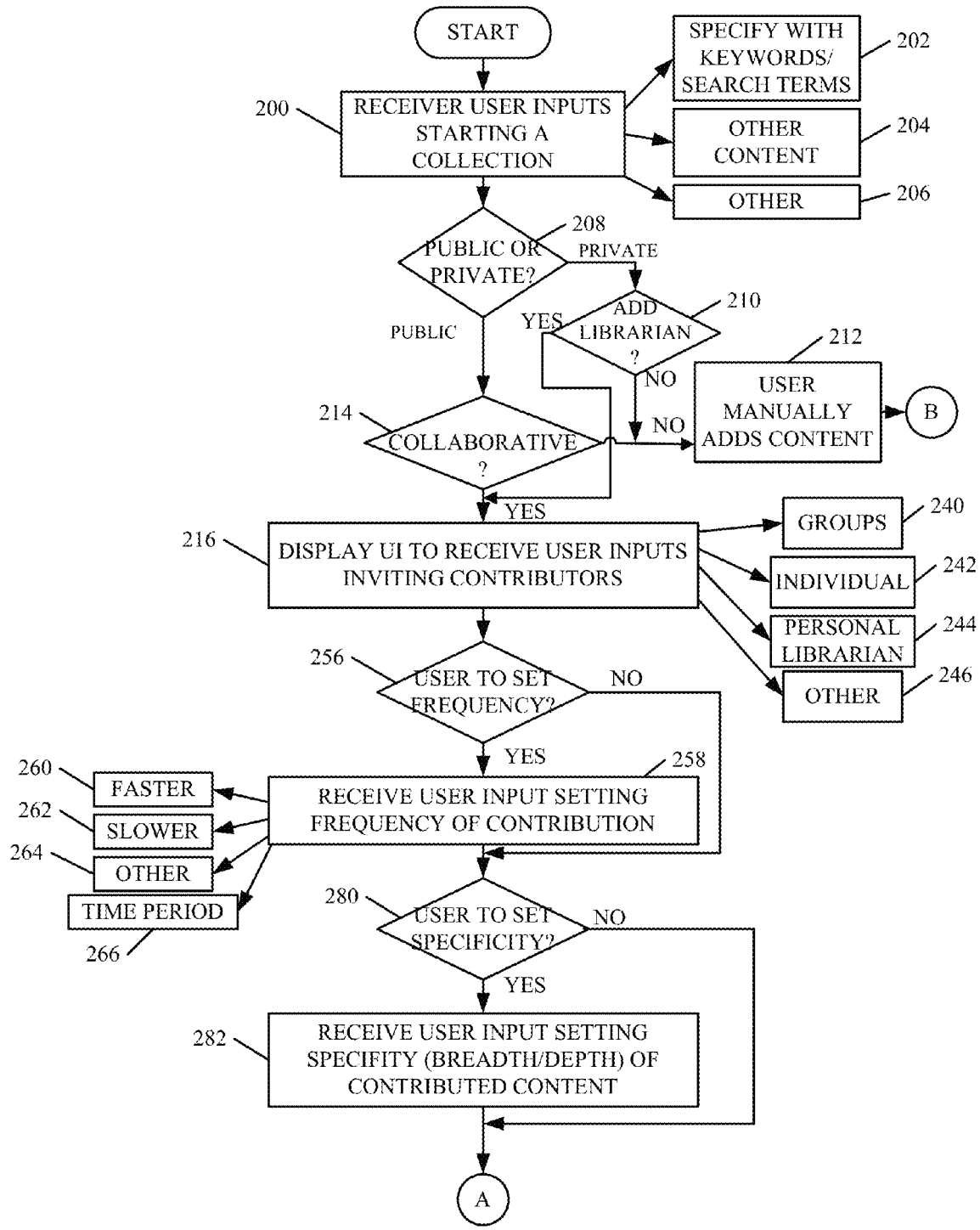
FIGS. 2A and 2B (collectively referred to as FIG. 2) show a flow diagram of one embodiment of the overall operation of the architecture shown in FIG. 1.
Figure 2B:
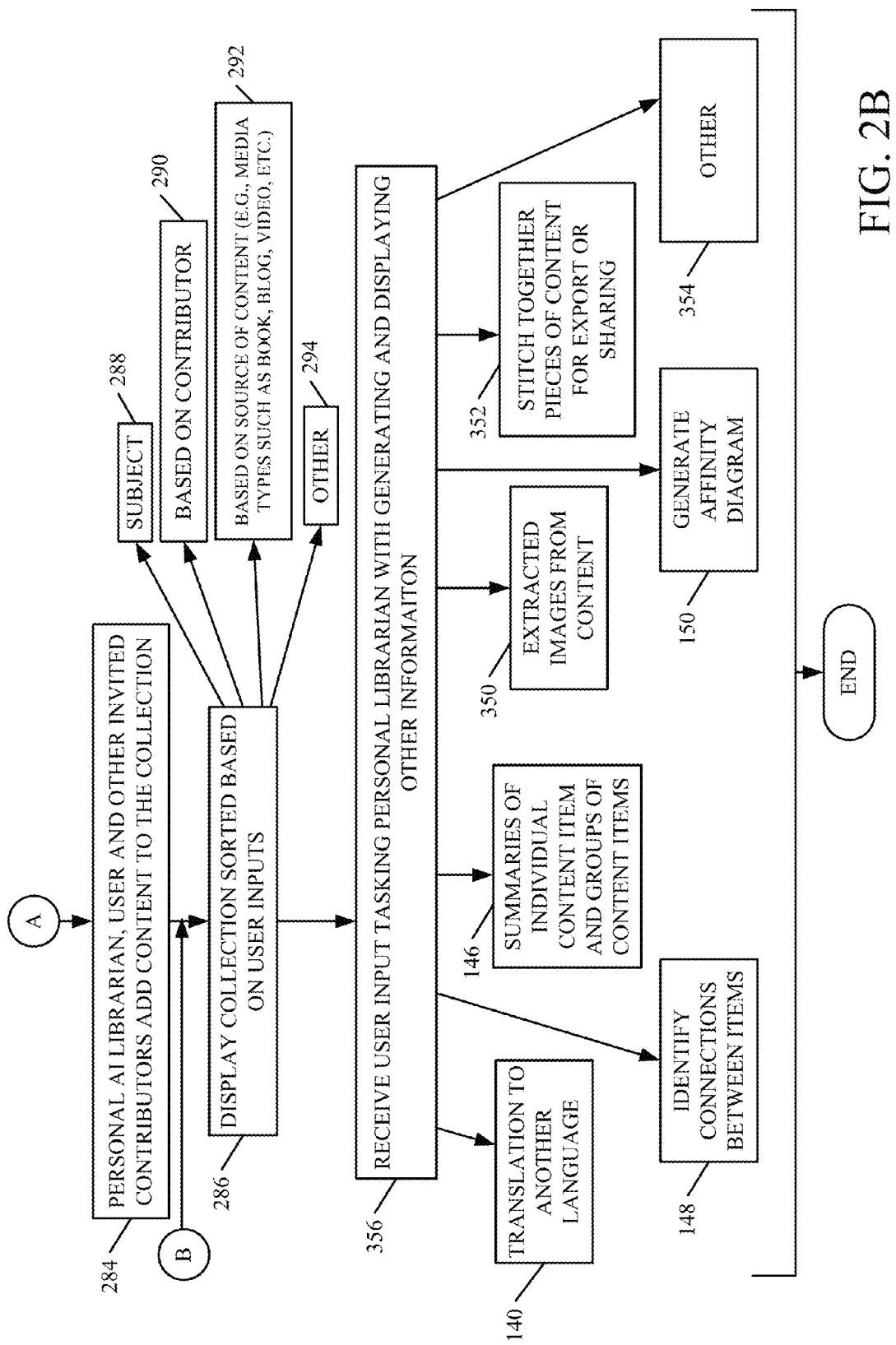

FIGS. 2A and 2B (collectively FIG. 2) show a flow diagram illustrating one embodiment of the operation of architecture 100 in generating content for a collection of collected data 136 in more detail. FIGS. 2C-2G are illustrative user interface displays. FIGS. 2-2G. are now described in conjunction with one another.

User 104 first provides user inputs through user input mechanisms 124 on one of the user devices (in this example, user device 106) to indicate that the user wishes to start a collection. This is indicated by block 200 in FIG. 2. User 104 can do this by specifying key words or search terms 202, specifying other content 204 that is similar to the content that the user is interested in, or providing other inputs 206.

Content collection system 102 then generates a user interface display that allows the user to indicate whether the collection is public (such as available to collaborators or other users) or private. This is indicated by block 208. If the user indicates that the collection is private, the user can still add personal AI librarian component 156 as a contributor to the content. The user is provided a user interface mechanism to select this. This is indicated by block 210 in FIG. 2. If the librarian is not added, then the user simply manually adds content to the collection as indicated by block 212. If the librarian is added, then processing continues below with respect to block 216.

Figure 2C:
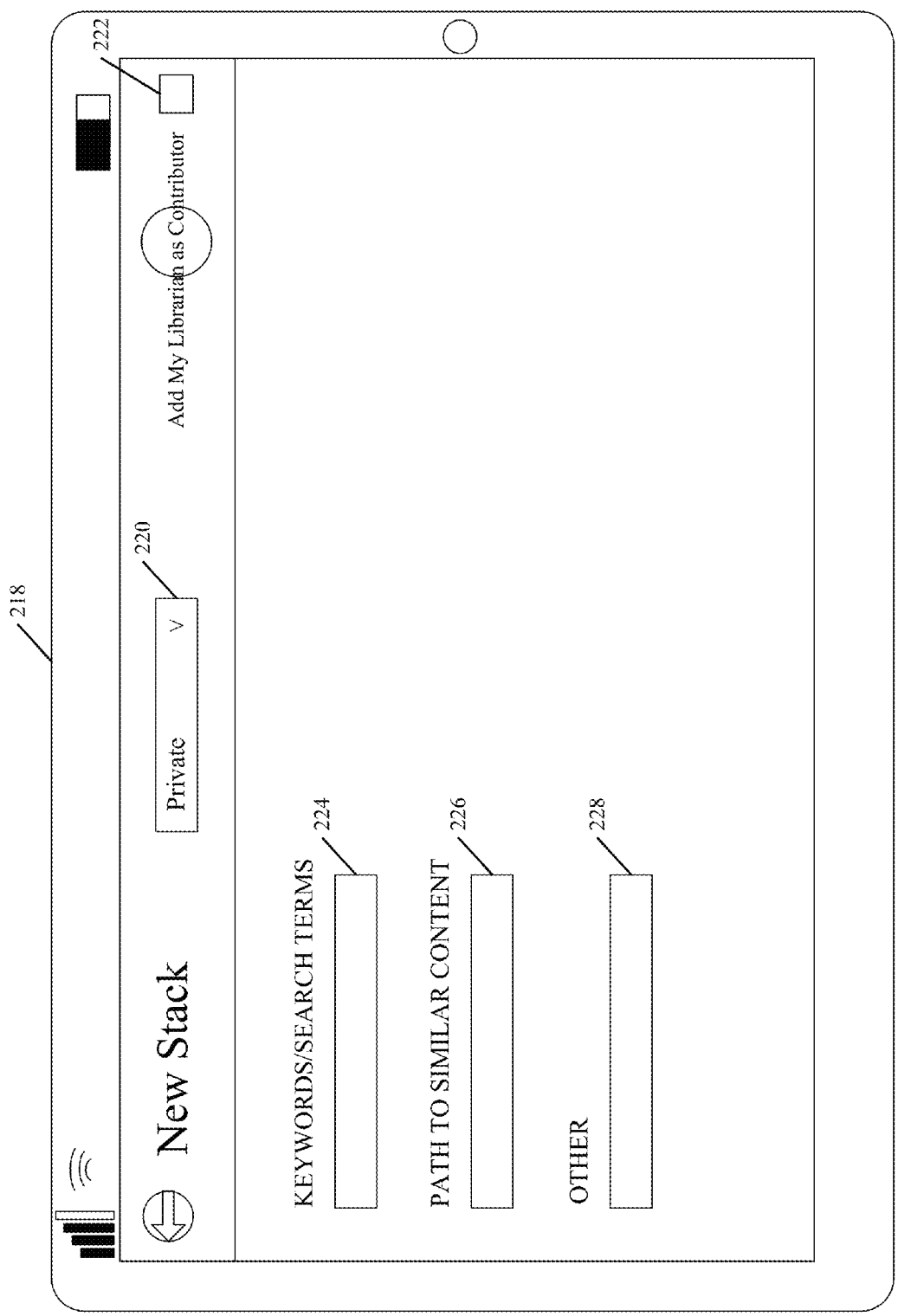
FIGS. 2C-2G are illustrative user interface displays.
Figure 2D:
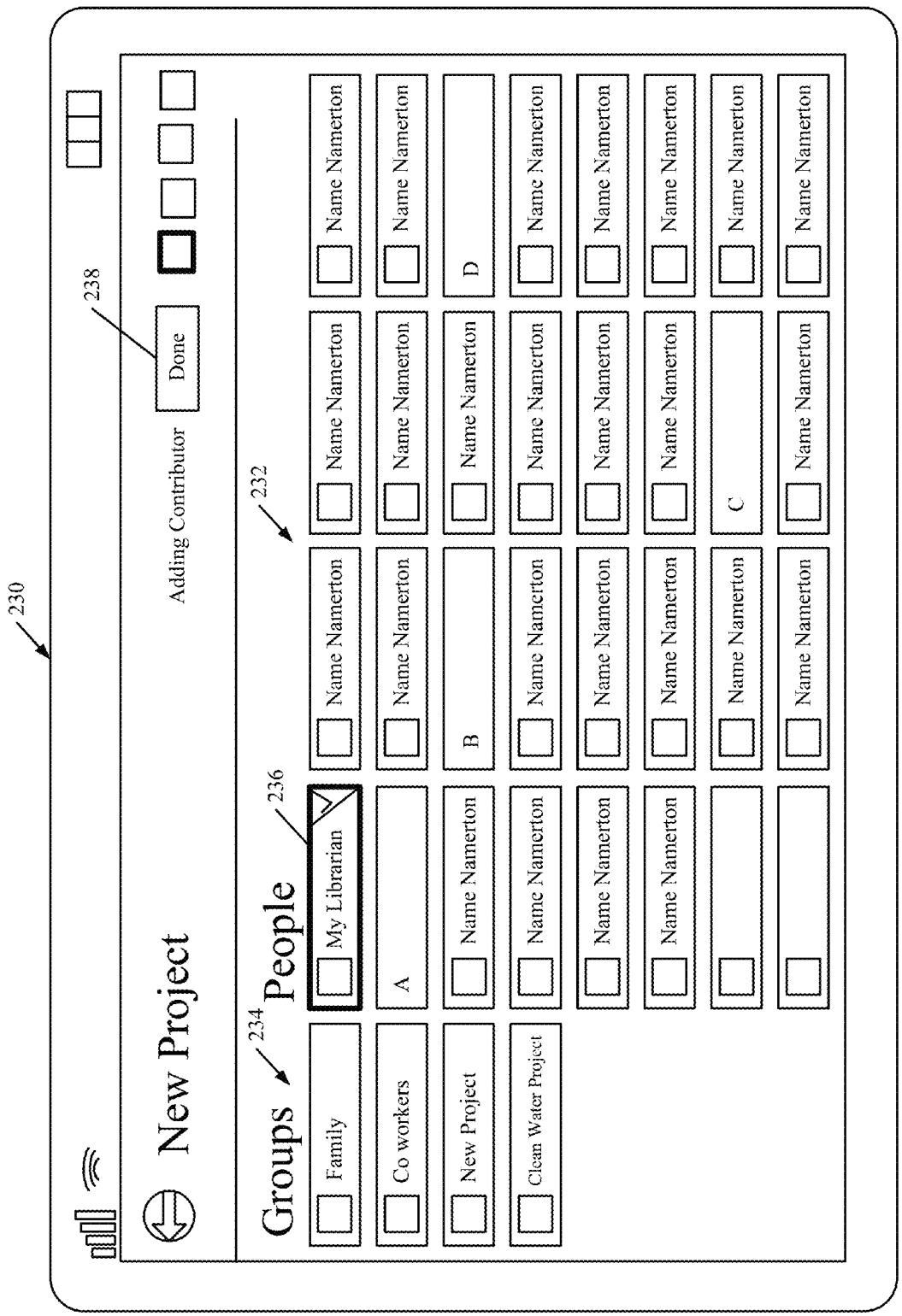

FIG. 2C shows one illustrative user interface display 218 generated by content collection system 102 that allows user 104 to define a new collection (or new stack) to indicate whether it is public or private, and to add personal librarian component 156 as a contributor. FIG. 2C shows user interface display 218 with dropdown menu box 220. When the user actuates box 220, the user can choose whether the new collection is public or private. Checkbox 222 allows the user to add personal librarian component 156 as a contributor to the new collection, regardless of whether it is public or private. Text boxes 224, 226, and 228 are examples of how a user can expressly declare the subject matter of the new collection. For instance, the user can enter keywords or search terms in text box 224. In addition, the user can provide the path or link to a similar document (or other item of similar content) that is similar to what the user is looking for. In such an embodiment, content collection system 102 uses natural language understanding (NLU) component 160 to analyze the similar document (or other similar content) to identify its subject matter. This is used to identify the subject matter of the new collection being initiated by user 104. Of course, the user can provide other information in box 228 (or any other suitable user input mechanism) to expressly declare the subject matter of the new collection.

At block 214 in FIG. 2, if the new collection is not to be limited to user 104 and the personal librarian component 156, content collection system 102 uses contributor selection component 168 to present the user with a user interface display that allows the user to indicate whether the collection is to be a collaborative collection. If so, contributor selection component 168 generates a user interface display that receives user inputs inviting contributors to contribute to the new collection. FIG. 2D is one embodiment of a user interface display 230 for doing this.

User interface display 230 shows one embodiment in which people (including the librarian component 156) are represented by checkboxes 232. Groups of people are represented by checkboxes 234. By clicking (or otherwise selecting) one of the checkboxes, user 104 can invite the associated person (or group) to the new collection. In the embodiment shown in FIG. 2D, the librarian component is specifically represented by box 236. The remaining people are arranged alphabetically and are represented by the remaining boxes 232. When the user selects one of those boxes, the corresponding user or person is automatically notified (such as through a message, an electronic mail message, instant message, social network message, a work network message, or another type of message or notification) that they have been invited to collaborate on the new collection. Also, user interface display 230 is updated to show that each selected user has been selected to collaborate on the collection. Similarly, when one of the group boxes 234 is selected by the user, each member of the associated group is notified as well.

When the user is finished inviting contributors for the new collection, the user can simply actuate the "done" button 238. Inviting groups is indicated by block 240 in FIG. 2, inviting individuals is indicated by block 242, inviting the personal librarian is indicated by block 244, and inviting other people or other contributors is indicated by block 246.

Figure 2E:
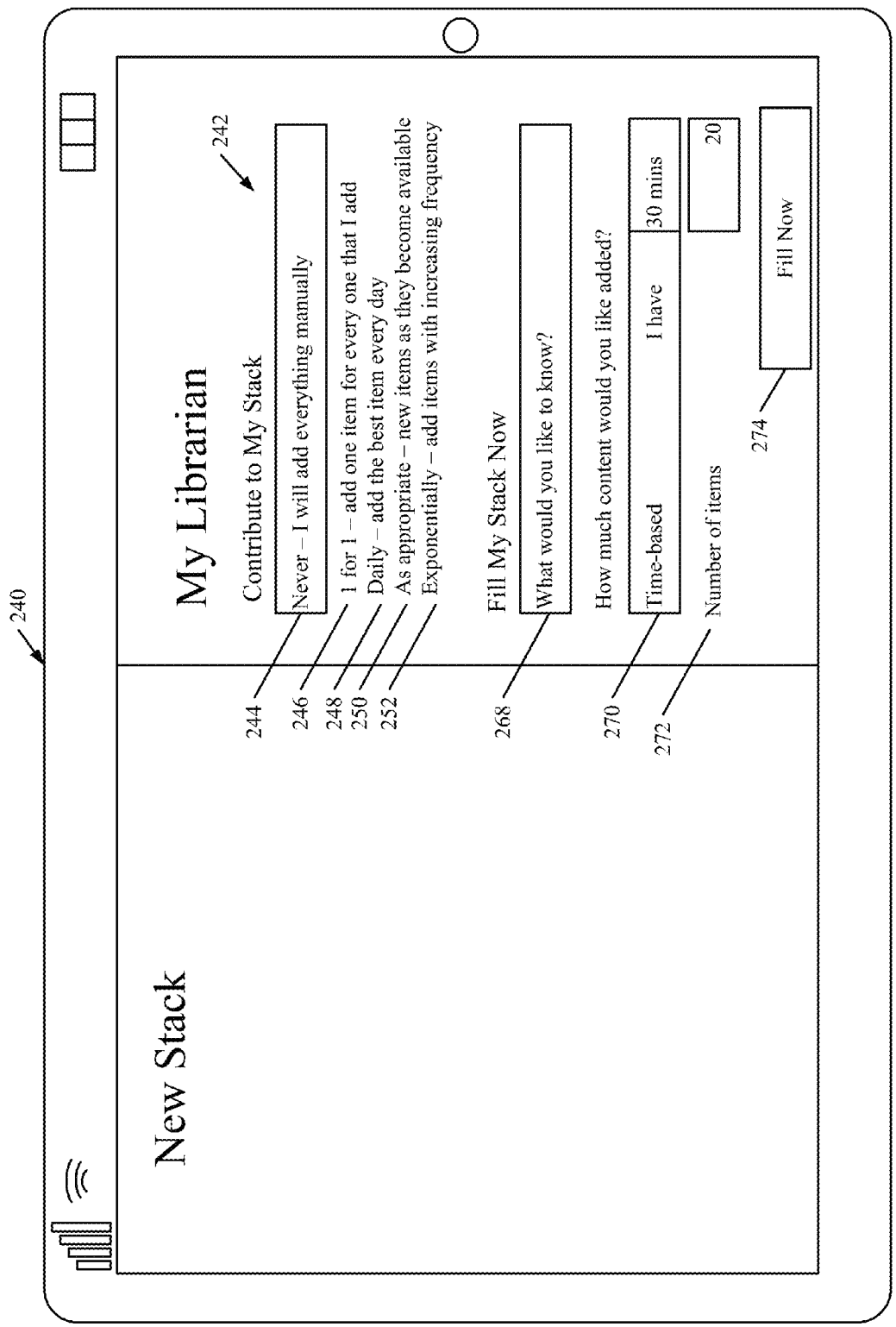

Contributor selection component 168 then generates a user interface display that allows the user to set the frequency with which personal librarian component 156 adds content to the new collection. FIG. 2E shows one embodiment of a user interface display 240 for doing this. User interface display 240 includes a frequency setting section 242 that allows user 104 to set a frequency with which the automated librarian component 156 adds content. In the embodiment shown in FIG. 2E, the user can select one of a plurality of different selectable frequencies 244-252. For example, the user can elect that the librarian is only to offer possibilities to the user and the user adds them manually. This is indicated by button 244. In addition, the user can authorize the librarian component 156 to automatically add one item for every one that the user adds. This is indicated by button 246. Similarly, the user can authorize the librarian to add one item a day, or add items as they become available. This is indicated by buttons 248 and 250, respectively. Also, the user can authorize the librarian to add items with increasing frequency (e.g., exponentially) as indicated by button 252.

By adding items with increased frequency, this can improve the helpfulness of component 156. For example, component 156 can analyze the content manually added to the collection. As the user manually adds content, component 156 will thus have a better understanding of exactly what the user is looking for. Therefore, component 156 can be set to add content with increasing frequency because the later-added content may be more relevant (and more helpful) than the earlier-added content.

Determining whether the user is setting the frequency for the librarian is indicated by block 256 in FIG. 2, and receiving the user inputs for setting the frequency of contribution is indicated by block 258. Setting the contribution frequency faster is indicated by block 260, slower is indicated by block 262 or otherwise is indicated by block 264.

FIG. 2 also shows that the user can set a predefined time period 266 over which the librarian is to add content. Referring again to FIG. 2E, user interface display 240 shows a query input 268 and a predefined timing input 270. For instance, if the user is looking for a relatively quick answer to a question (such as a recommendation for an Italian restaurant), the user can simply type the query in text box 268 and set a time in box 270 within which the user would like to have the recommendations. In addition, in box 272, the user can identify a number of suggestions or recommendations that the user would like in the collection. In the embodiment shown in FIG. 2E, the user has indicated that he or she has 30 minutes to receive the collection and that the user would like 20 items in the new collection (or stack). When the user actuates button 274, librarian component 156 begins adding content to the new collection (or stack).

It will also be noted that the user can have the librarian component 156 autofill the collection or match the pace of the user or a collaborator, a competitor or another user.

While the time period and the contribution frequency are shown as discretely selectable buttons in FIG. 2E, they could be selected in other ways as well. For instance, the user interface display can include a slider that can be movable to set the contribution frequency of librarian component 156. Of course, other user input mechanisms can be used as well.

Referring again to FIG. 2, in one embodiment, the user 104 can also set the specificity of the content which librarian component 156 is to return. For instance, librarian component 156 can be asked to provide increasingly specific and relevant information as more items are added into the collection by the user. Librarian component 156 determines that these manually added items are highly relevant, and can use NLU component 160 to identify their content and subject matter, and refine the search criteria it is using to search for relevant content. Librarian component 156 can also be tasked with adding content from related subjects to provide more context and breadth to the collection. Similarly, librarian component 156 can use NLU component 160 to analyze the collected content and identify gap-filling content that can be used to fill the gaps in the current collection. The user can determine this by setting the specificity or breadth with which librarian component 156 is to search. Determining that the user is going to set the specificity is indicated by block 280 in FIG. 2 and receiving user inputs setting specificity of the contributed content is indicated by block 282. Again, this can be done using a wide variety of different user input mechanisms, such as a slider that can be moved from broad to narrow (identifying the type of content sought), using a textbox, a checkbox, etc.

Once properly configured, the personal librarian component 156 and other invited contributors add content to the collection over time. This is indicated by block 284 in FIG. 2.

It should be noted that, as user 104 is adding content, user 104 can add content from any of a plurality of different user devices 106-108. For instance, the user can select content from his or her desktop computer and add it to collected data 136. Similarly, the user can select content using his or her tablet computer or smart phone, or other device, and add it to collected data 136 as well.

Once items have been collected in the collection (e.g., collected data 136) they can be displayed and sorted based on user inputs. This is indicated by block 186 in FIG. 2. For instance, they can be sorted by subject 288, based on who they were contributed by 290, or based on the source of the content, such as the type of media (e.g., book, blog, video, etc.). This is indicated by block 292. Of course, they can be displayed and sorted in other ways as well, as indicated by block 294.

Figure 2F:
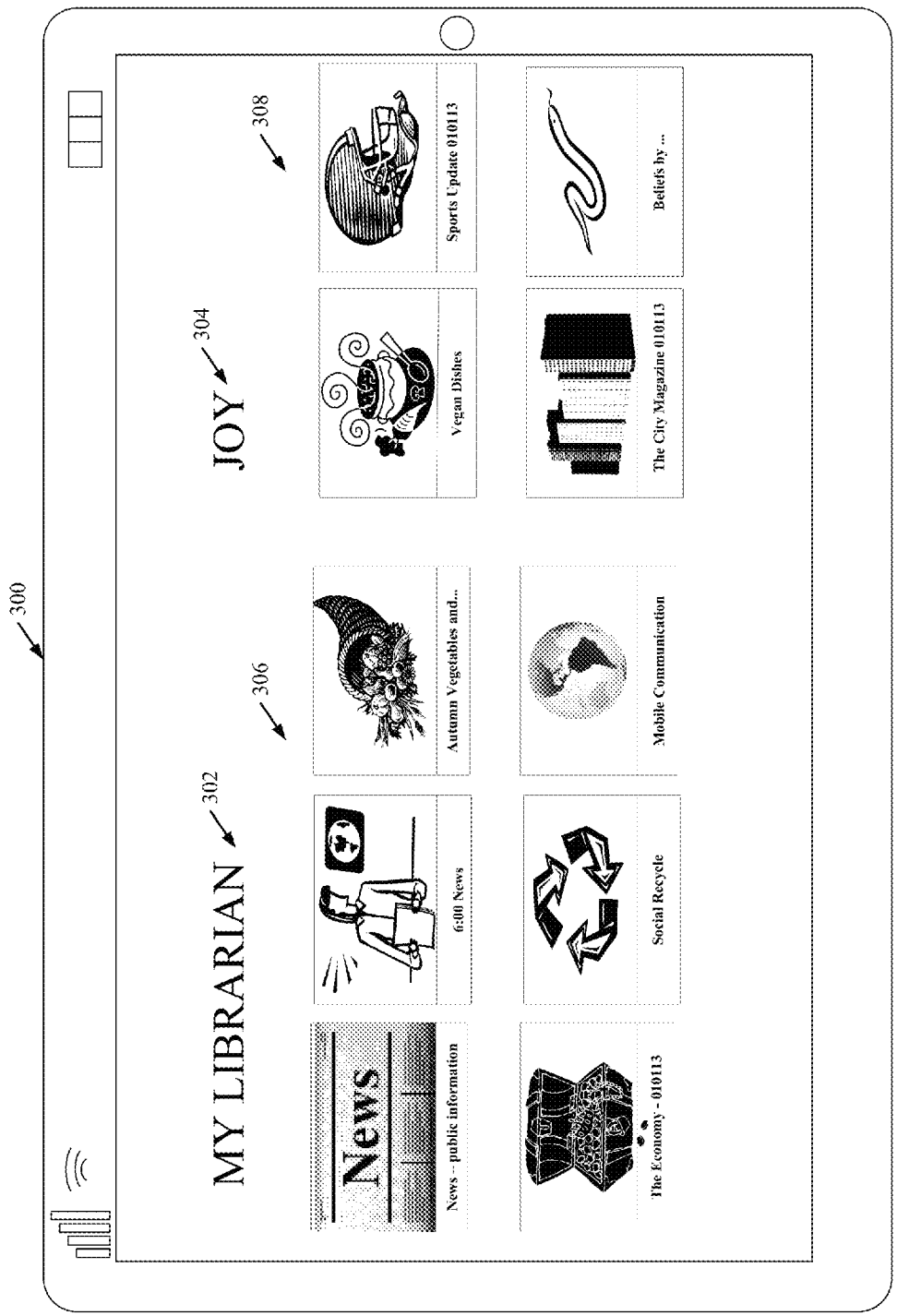
Figure 2G:
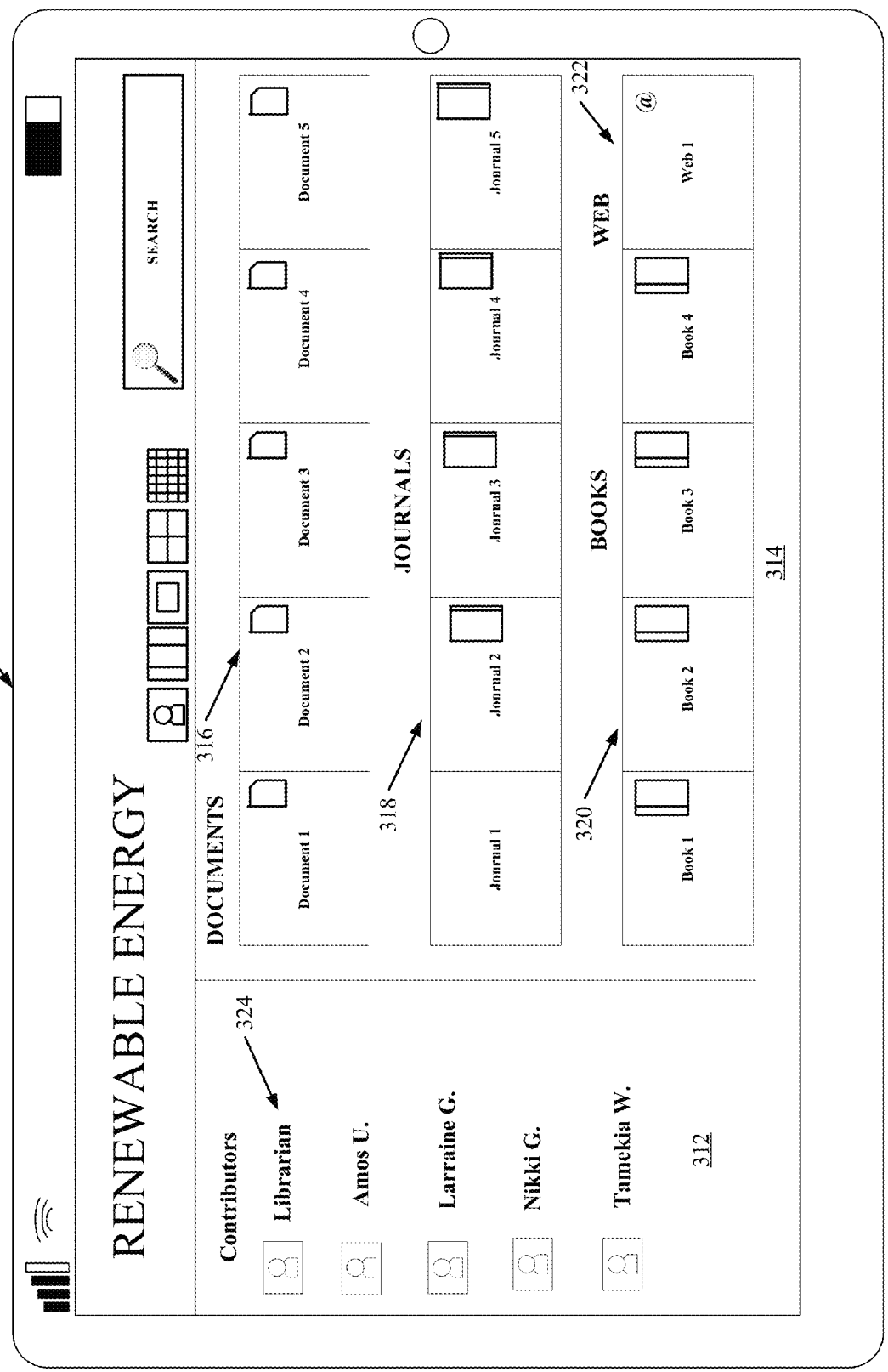

FIG. 2F shows one example of a user interface display 300 that shows content of a collection sorted by the contributor. In the embodiment shown in FIG. 2F, there are two contributors, one is the automated librarian component 156 shown generally at 302, and the other is a contributor named Joy, shown generally at 304. Under the names of the contributors, there is illustratively a link to each item of content added by that contributor. It can be seen that the links can be to videos, documents, blogs, articles, etc. The links to content added by the librarian are shown generally at 306, while the links to content added by Joy are shown generally at 308.

FIG. 2G shows another embodiment of a user interface 310 that lists contributors in a contributors pane 312 and content in a collection pane 314. In one embodiment, the content in pane 314 is sorted by content type. Documents are shown generally at 316, journals are shown generally at 318, books are shown generally at 320, and web items are shown generally at 322. Of course, these are only examples of different types of content, and others can be shown as well.

In addition, in the embodiment shown in FIG. 3G, the contributors in pane 312 are somehow tied visually to the content that they contributed in collection pane 314. For instance, in one embodiment, the icons or words, or other indications corresponding to the contributors in pane 312 are color coded to correspond with the links to content that they contributed, displayed in collection pane 314. In other words, if the librarian contributor shown generally at 324 is blue in color, then each link to a document, journal, book, or website, added by librarian 324 can be outlined or otherwise shown in blue as well. In this way, user 104 can see not only who the contributors are, and what types of items are in the collection, sorted by media type, but also who contributed those items.

Regardless of how the collection is displayed, automated librarian component 156 is illustratively shown in the same way as any human contributor is shown. User 104 can easily tell which content was added automatically, and which was added manually.

Content collection system 102 can also provide user interface displays that receive user inputs for tasking personal librarian component 156 to perform other tasks as well. For instance, where content is identified in a plurality of different languages, librarian component 156 can use machine translator 170 to generate a translation 140 into another language and store the translation. Component 156 can identify the target language in a number of different ways. For instance, user 104 can specify a target language to which all content is to be translated. Alternatively, or in addition, component 156 can identify the language that user 104 normally operates in and translate the content to that language. Librarian component 156 can also use connection identifier 174 to identify connections 148 between items in the collected content and user 104, or between collected items and other collected items, or between items in the collected content and a social graph corresponding to user 104, etc. In doing so, component 156 can access user information 142 to identify connections. The user information 142 illustratively includes a social graph (from a social network or otherwise) corresponding to user 104. It also illustratively includes profile information, such as the user's location, certain preferences, etc. The connections 148 can take a wide variety of different forms. By way of example, the connections can illustrate how user 104 may be connected to the author of a piece of content, or they could indicate that one of the user's interests corresponds to one of the interests of the author, etc. In addition, they can indicate that the author of one of the pieces of contributed content is speaking at a town located geographically near user 104. It can also show who in the user's personal network or social graph knows the author or subject of the story. Likewise, it can show people in the user's personal network or social graph who also read/liked/connected/pinned/etc., this content, or content with a related subject matter. All of these and many other types of connections 148 can be generated as well.

In addition, component 156 can use summarization component 172 to generate summaries of the collected content. The summaries 146 can be summaries generated for each individual item of content in the collection, or for groups of content in the collection. In one embodiment, users can ask for summaries based on how much time they have. For example, "give me the 5 minutes version" or "give me the 5 hour version". Component 156 can also extract images 350 from the collected content. Further, it can use grouping/sorting component 176 to generate one or more affinity diagrams 150 for the collected content. The affinity diagrams illustratively show how the content can be grouped or sorted according to a wide variety of different characteristics. They can be grouped or sorted by media type, by author, by subject matter, based on time of authorship, time of collection, or based on a wide variety of other types of sorting criteria. The content can be dynamically sorted, pivoted, filtered or reorganized in a variety of different ways. Component 156 can do this to reveal new clusters, groups, subjects, connections, etc. that the user may not have thought of or noticed.

In addition, component 156 can extract and stitch together pieces of the collected content for export or sharing with other users or collaborators. This is indicated by block 152 in FIG. 2. Component 156 can be tasked with performing other jobs as well, such as tagging the content using tagging component 178, or other tasks. This is indicated by block 354. Receiving user input tasking personal librarian component 156 with generating and displaying other information is generally indicated by block 356 in FIG. 2.

It should also be noted that component 156 can access application information 158 that identifies a type of application that component 156 is acting in. For instance, if collected data 136 is used in a word processing application, the content can be identified and added to the collection in one way. While if the collected data 136 is used in a slide presentation application, component 156 can identify and add it in a different way. These are examples only. The librarian component 156 can also utilize the functionally of that particular application. For example, a librarian component 156 within a word processing program can take advantage of grammatical suggestions that belong to the functionality of the program, to be a better or more useful contributor. Further, librarian component 156 within a word processing program can be particularly smart about language, whereas the librarian component 156 in a design program can be particularly smart about formatting and color, all by leveraging the tools and functionality of the program itself.

Figure 3:
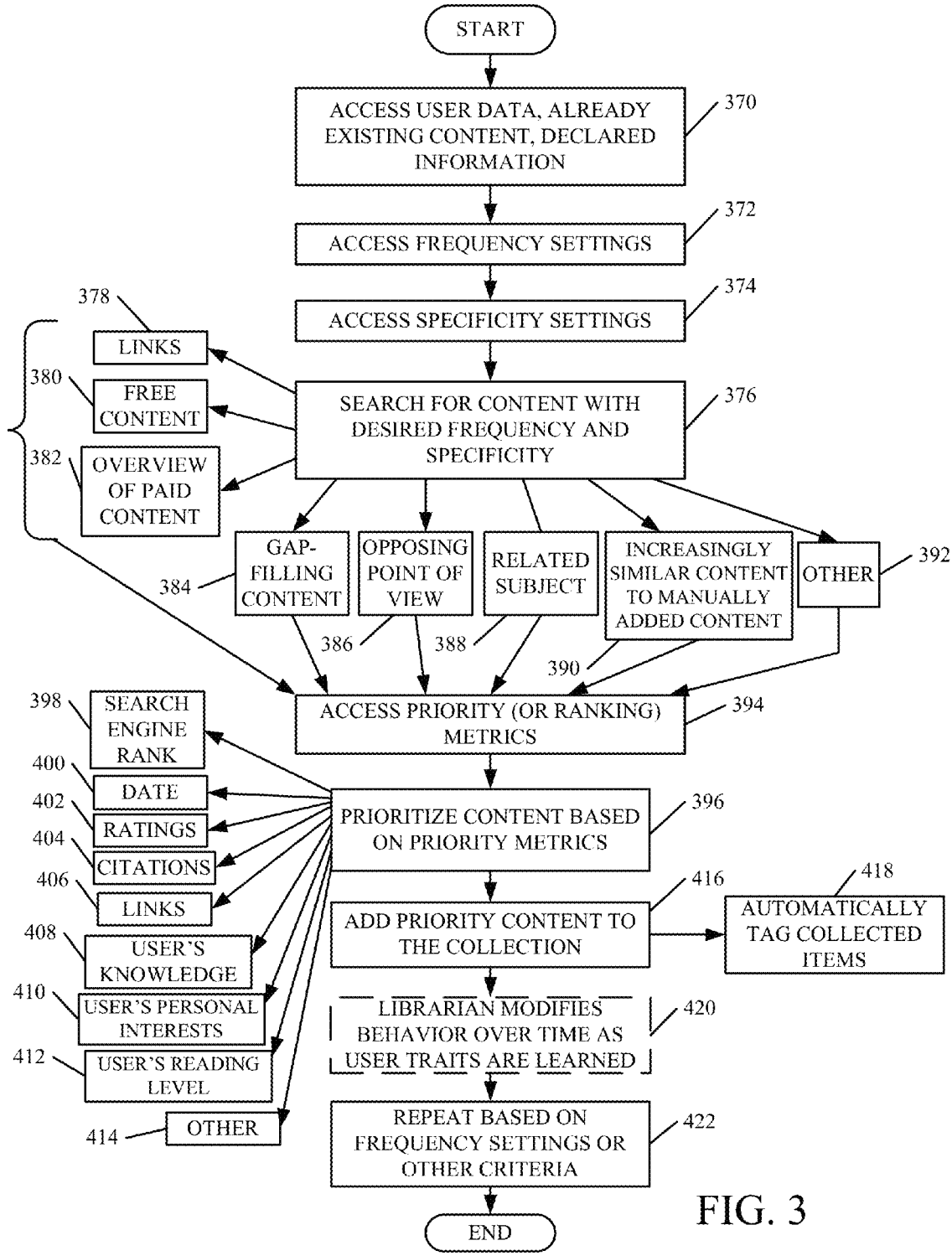
FIG. 3 is a flow diagram illustrating one embodiment of the operation of a personal artificial intelligence (AI) librarian component.

FIG. 3 is a more detailed flow diagram illustrating one embodiment of the operation of personal librarian component 156 in adding content to the collected data 136 in data store 134. Component 156 first accesses user information 142 in data store 134 and any existing content that already exists in the collection, as well as any declared information by user 104 declaring what type of information is to be added to the content. This is indicated by block 370 in FIG. 3. Component 156 then accesses the frequency settings and specificity settings discussed above with respect to FIG. 2 and then searches for content with the desired frequency and specificity. This is indicated by blocks 372, 374 and 376, respectively. In doing so, component 156 illustratively uses search engine 162 to search sites 118 with content to be searched. Of course, the search can be conducted in other ways as well.

In any case, once the search is conducted, component 156 can identify links 378 to content, portions of free content 380, overviews of paid content (such as books, etc.) 382, gap filling content 384 or content that discloses a generally opposing view to what is already in the collection. Also, it can suggest subject matter experts or leaders within that field of study. This is indicated by block 386. Of course, component 156 can identify related subject matter to what is already in the collection, as indicated by block 388. It will also be noted that librarian component 156 will illustratively refine the searching techniques to identify increasingly similar content to the content that has been manually added to the collection. This is indicated by block 390. Of course, component 156 can identify other content 392 as well.

Component 156 can then users ranking component 164 that accesses priority (or ranking) metrics 166 to prioritize or rank the content identified by librarian component 156. Accessing the metrics is indicated by block 394 in FIG. 3. Component 156 can then use ranking component 164 to prioritize or rank the content based on the priority or ranking metrics. This is indicated by block 396. The ranking metrics can include a wide variety of different metrics. For instance, they can include the search engine rank assigned to the results by search engine 162. This is indicated by block 398. In addition, they can include the date 400 of the content, the ratings 402 of the content provided by various social networks, or other ratings, or the number of citations 404 or links 406 to the content.

Component 156 can also prioritize or rank the content based on other information as well. For instance, it can use the user's knowledge 408 (as indicated by other content in the user's libraries, files, folders, etc.). Similarly, it can use the user's personal interests 410 from the profile or user information 142. In addition, the content can be prioritized based on the user's reading level 412. For instance, if the user is in $5^{th}$ grade, and the user is trying to collect information on green energy, the information may be prioritized differently than if the user is an engineering student looking for the same type of content. Prioritizing according to other metrics is indicated by block 414.

Component 156 then adds the content to the collection (collected data 136) in data store 134. This can be done in a number of different ways. For instance, component 156 may add only items that fall above a priority threshold, or may only add the highest prioritized item, etc. Adding the priority content to the collection is indicated by block 416 in FIG. 3. In doing so, component 156 can automatically tag the content as indicated by block 418, although this is optional and the user may be invited to tag, or re-tag, the content as well.

It will also be noted that component 156 can modify its behavior over time as user traits or preferences are learned. This is indicated by block 420. For instance, as the user becomes more knowledgeable in a certain subject matter area (as indicated by the content in the collection, other documents authored by the user, the user's emails, social network or browsing traffic, etc.) component 156 can modify its searching techniques to identify more complicated information or higher level information corresponding to that subject matter. Further, as the user tends to access a given subject matter of content less frequently, component 156 may update its search for that type of content less frequently. Of course, these are only two examples of how component 156 can modify its behavior based on user traits.

Component 156 then repeats the process of identifying content set out in FIG. 3 based on the frequency settings, the fixed duration for the research (if there is one) or based on other criteria. This is indicated by block 422.

Another example of a context in which content collection system 102 can be used is in a crowd sourced website or community environment. Librarian component 156 can be tasked to add content to the site or community at a pace that matches the pace of other additions to the site by the crowd or community. This is just one additional example.

Figure 4:
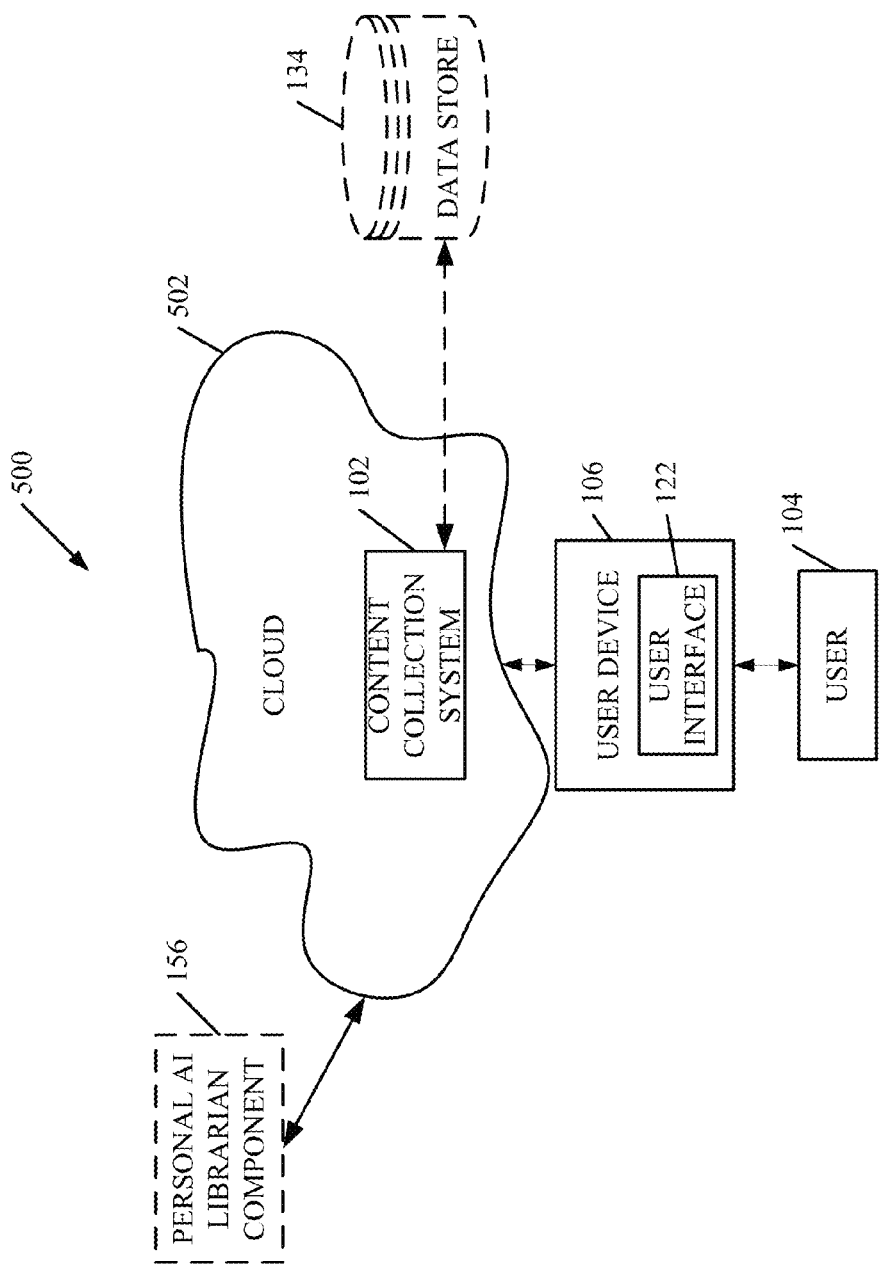
FIG. 4 shows one embodiment of the architecture in FIG. 1 deployed in a cloud-based architecture.

FIG. 4 is a block diagram of architecture 100, shown in FIG. 1, except that it's elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 4, some items are similar to those shown in FIG. 1 and they are similarly numbered. FIG. 4 specifically shows that content collection system 102 is located in cloud 502 (which can be public, private, or a combination where portions are public while others are private). Therefore, user 104 uses a user device 106 to access those systems through cloud 502.

FIG. 4 also depicts another embodiment of a cloud architecture. FIG. 4 shows that it is also contemplated that some elements of system 102 are disposed in cloud 502 while others are not. By way of example, data store 134 can be disposed outside of cloud 502, and accessed through cloud 502. In another embodiment, personal AI librarian component 156 is also outside of cloud 502. Regardless of where they are located, they can be accessed directly by device 104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
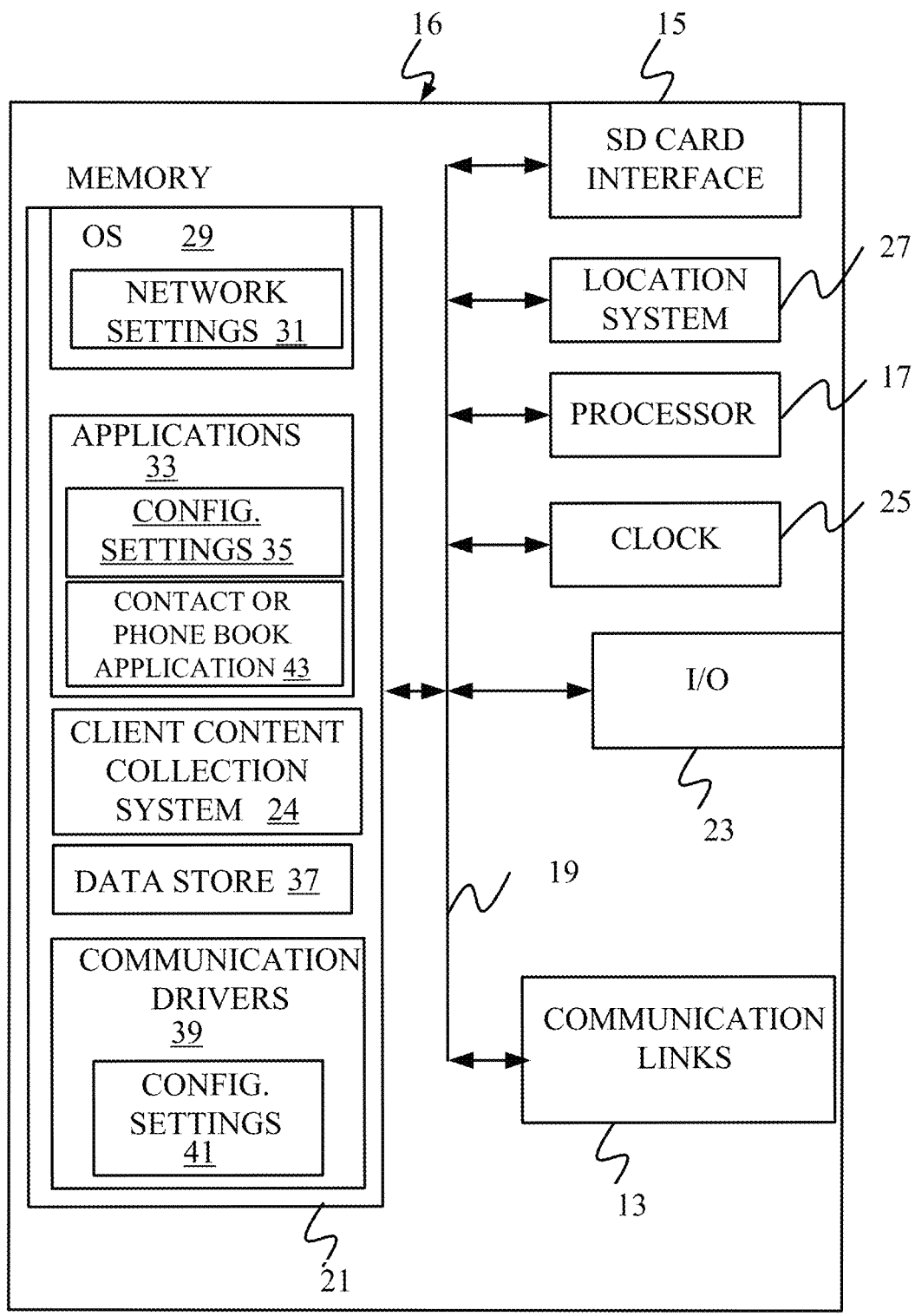
FIGS. 5-10 show various embodiments of mobile devices.

FIG. 5 is a simplified block diagram of one illustrative embodiment of a handheld or mobile computing device that can be used as a user's or client's hand held device 16, in which the present system (or parts of it) can be deployed. FIGS. 6-9 are examples of handheld or mobile devices.

FIG. 5 provides a general block diagram of the components of a client device 16 that can run components of content collection system 102 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like content collection system 102) are received on a removable Secure Digital (SD) card that is connected to a SD card interface 15. SD card interface 15 and communication links 13 communicate with a processor 17 (which can also embody processors 130, 132 or 154 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Collection data 136 or the items in data store 134, for example, can reside in memory 21. Similarly, device 16 can have a client content collection system 102 which can run various applications or embody parts or all of content collection component 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
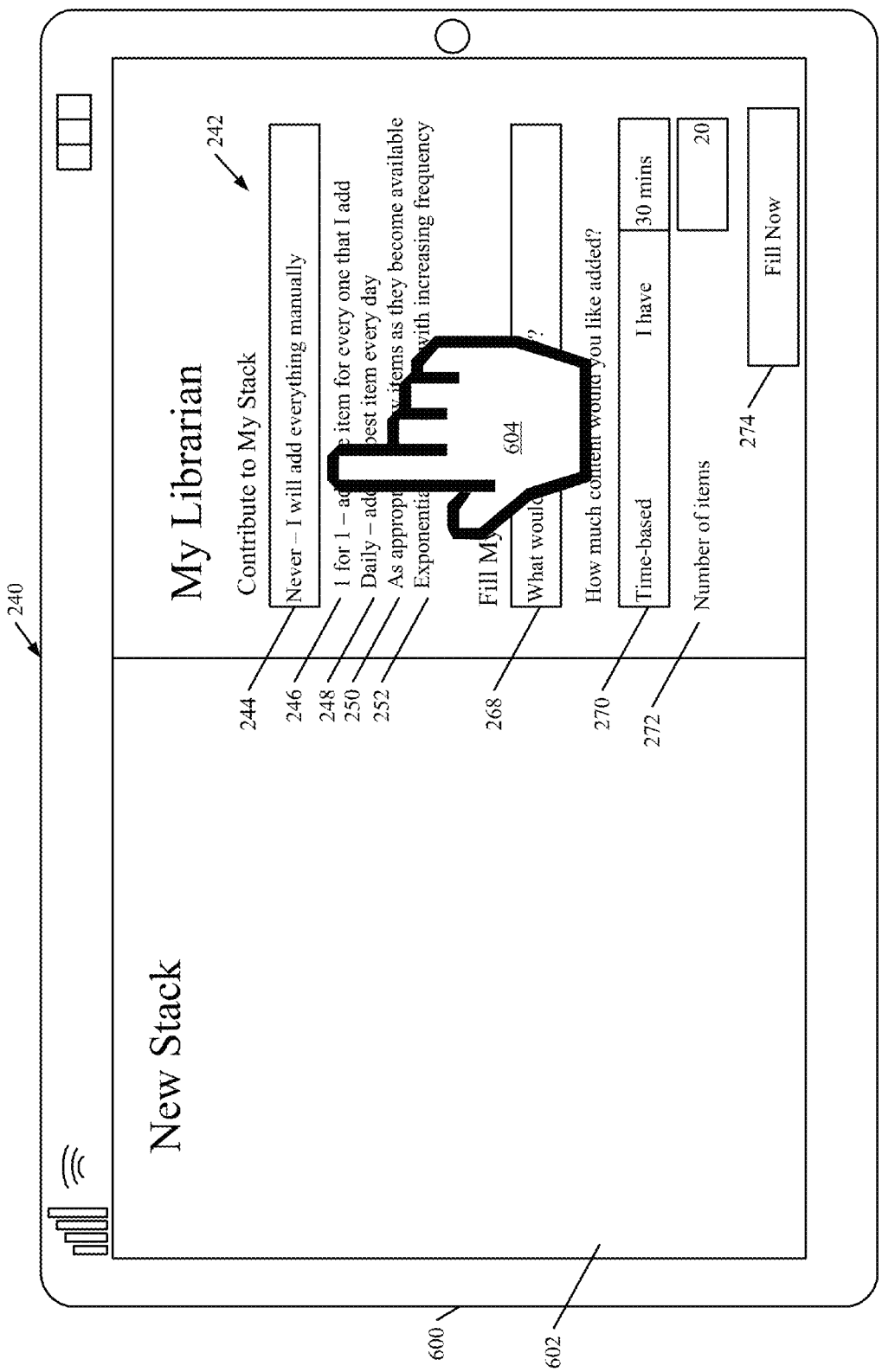

FIG. 6 shows one embodiment in which device 16 is a tablet computer 600. In FIG. 6, computer 600 is shown with user interface display 240 (from FIG. 2E) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 7:
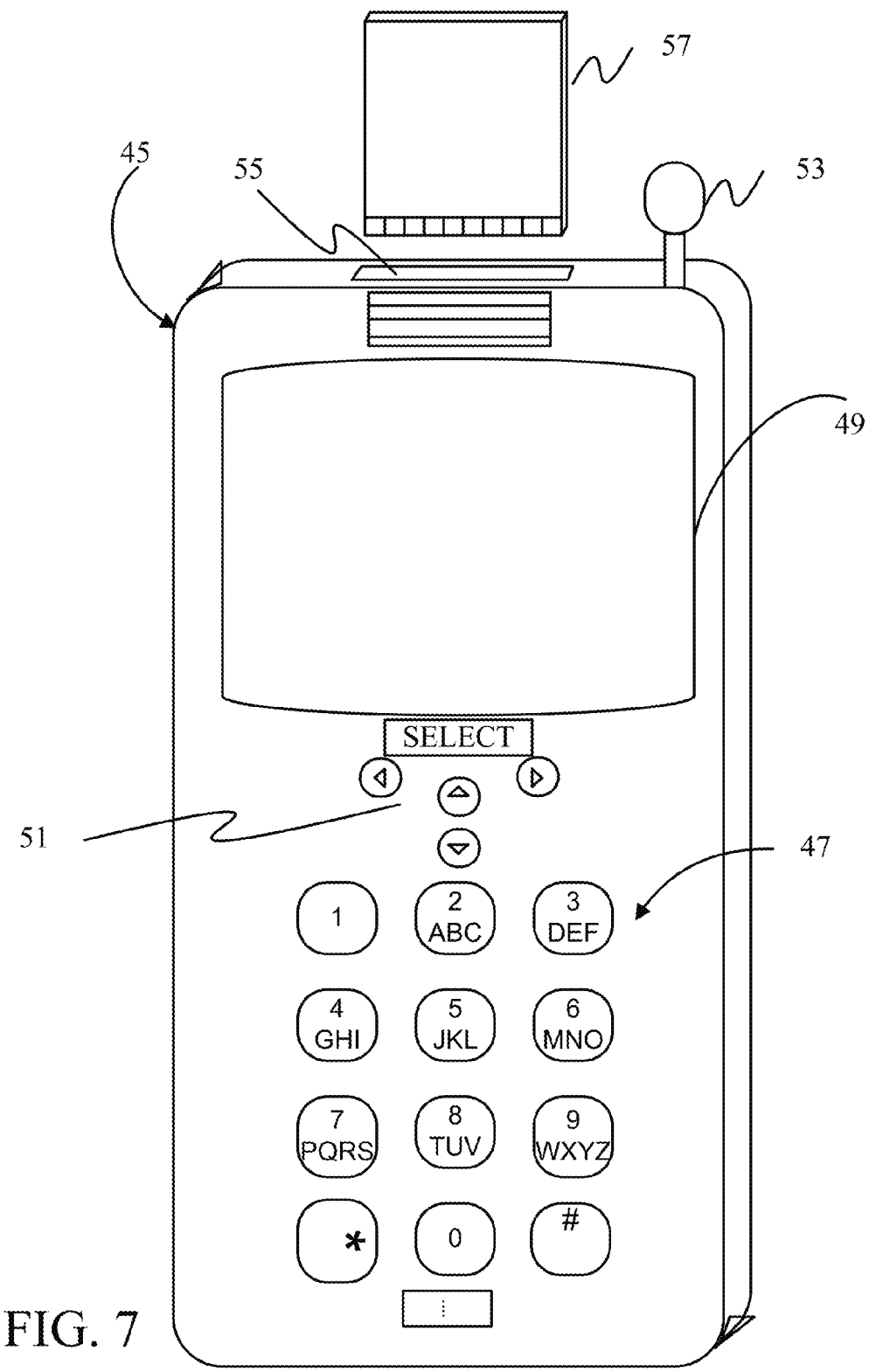
Figure 8:
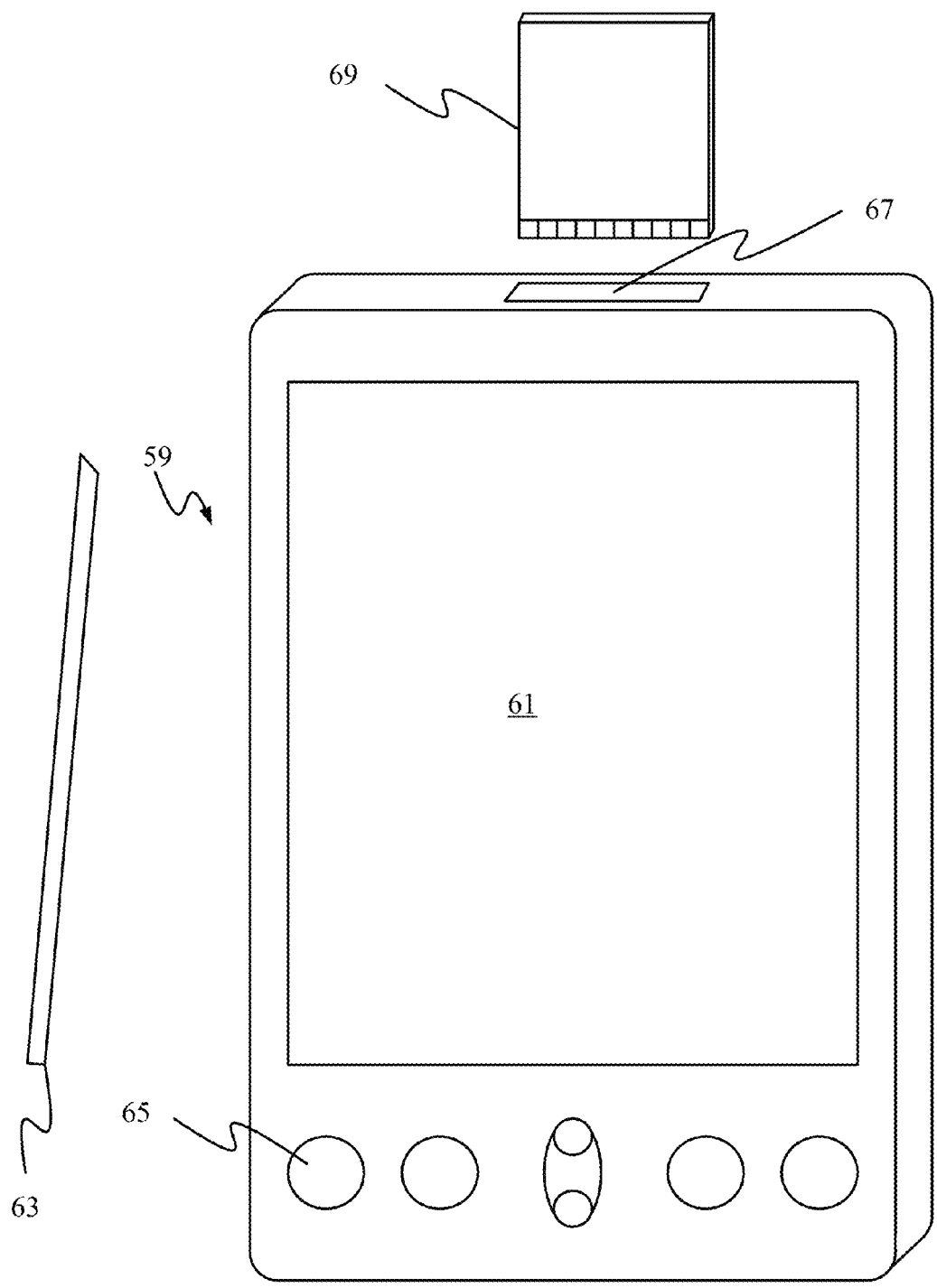

FIGS. 7 and 8 provide additional examples of devices 16 that can be used, although others can be used as well. In FIG. 7, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 9:
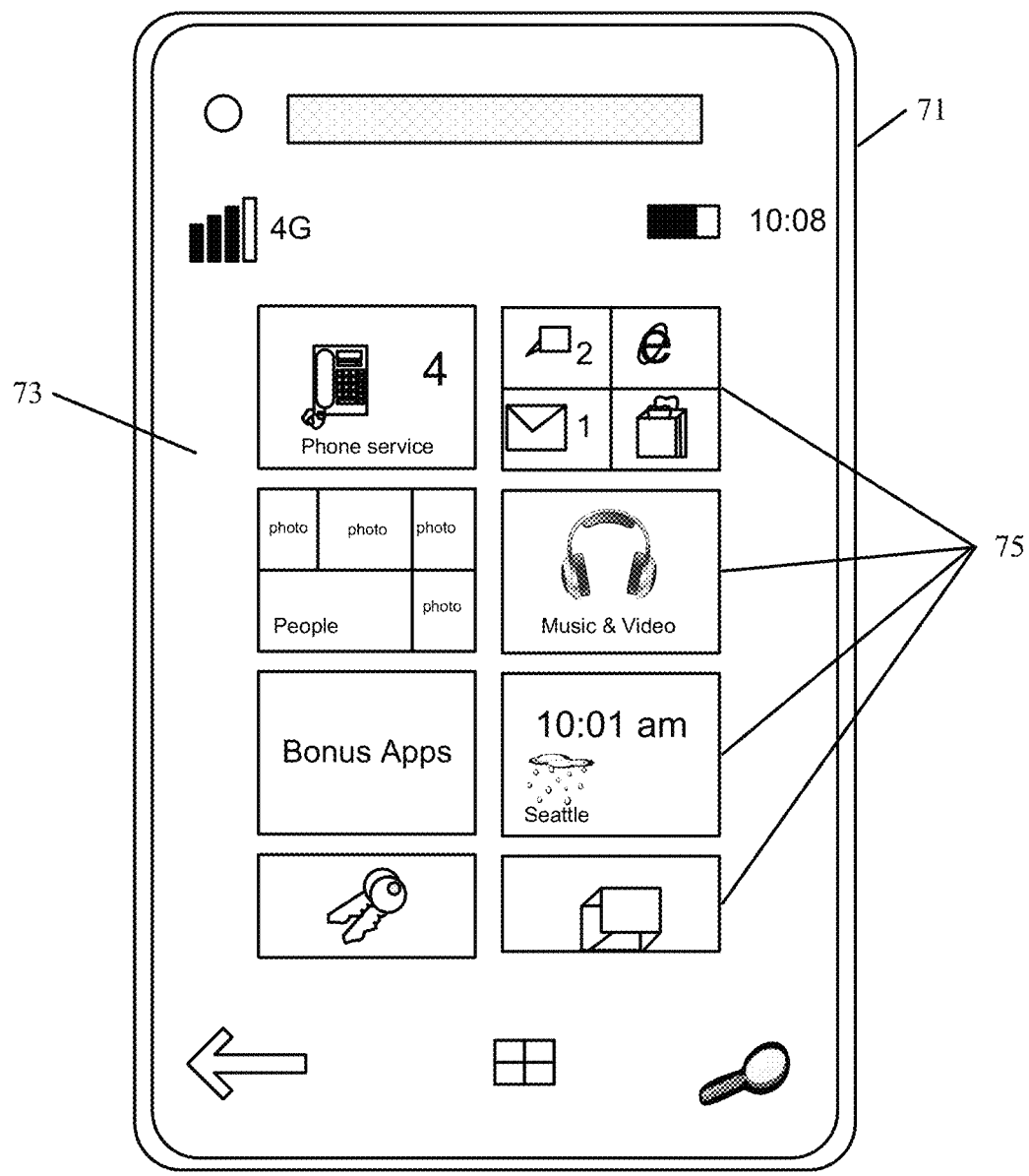
Figure 10:
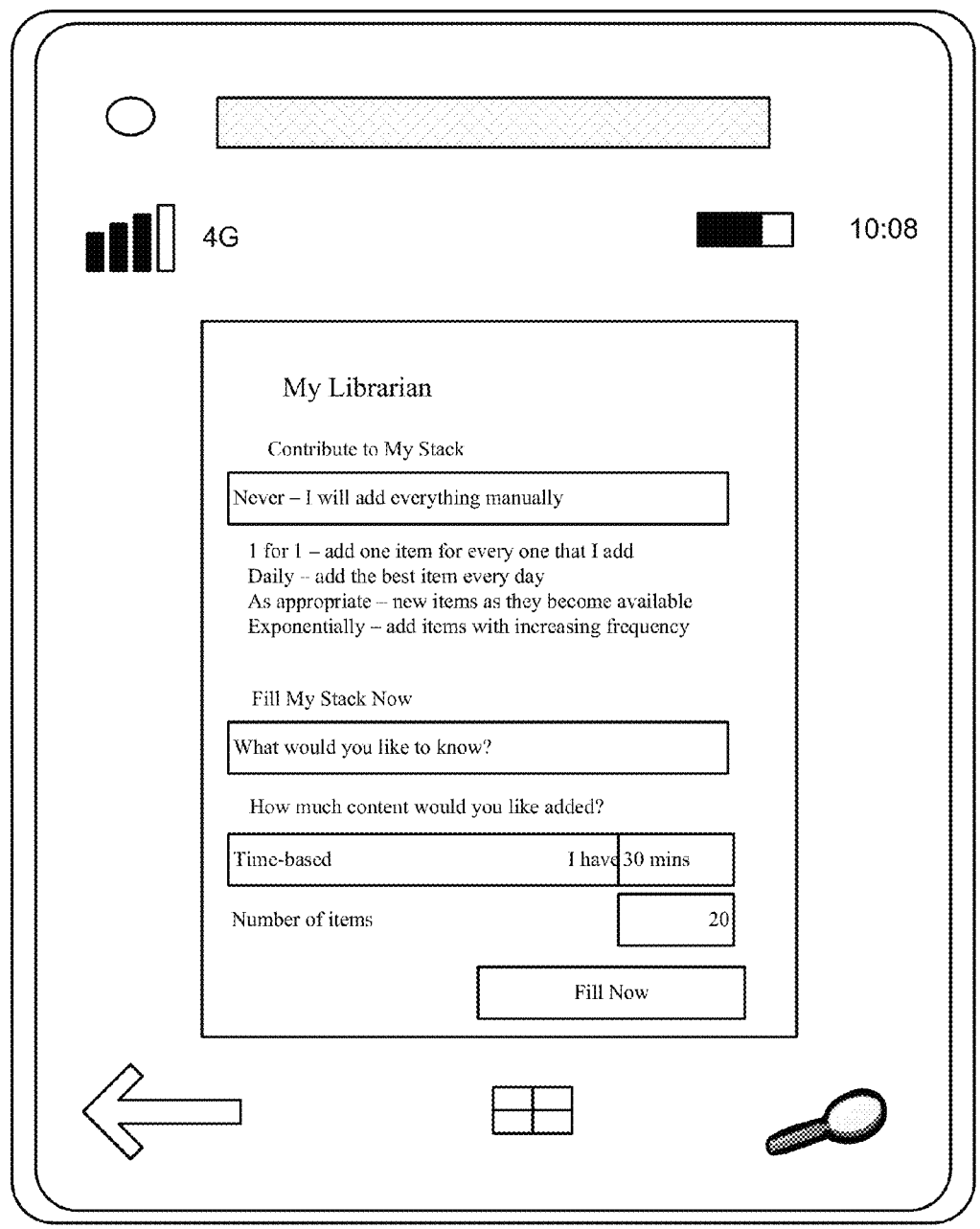

FIG. 9 is similar to FIG. 7 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 10 shows an embodiment of a smart phone 71 with the display 240 of FIG. 2E displayed on display 73.

Note that other forms of the devices 16 are possible.

Figure 11:
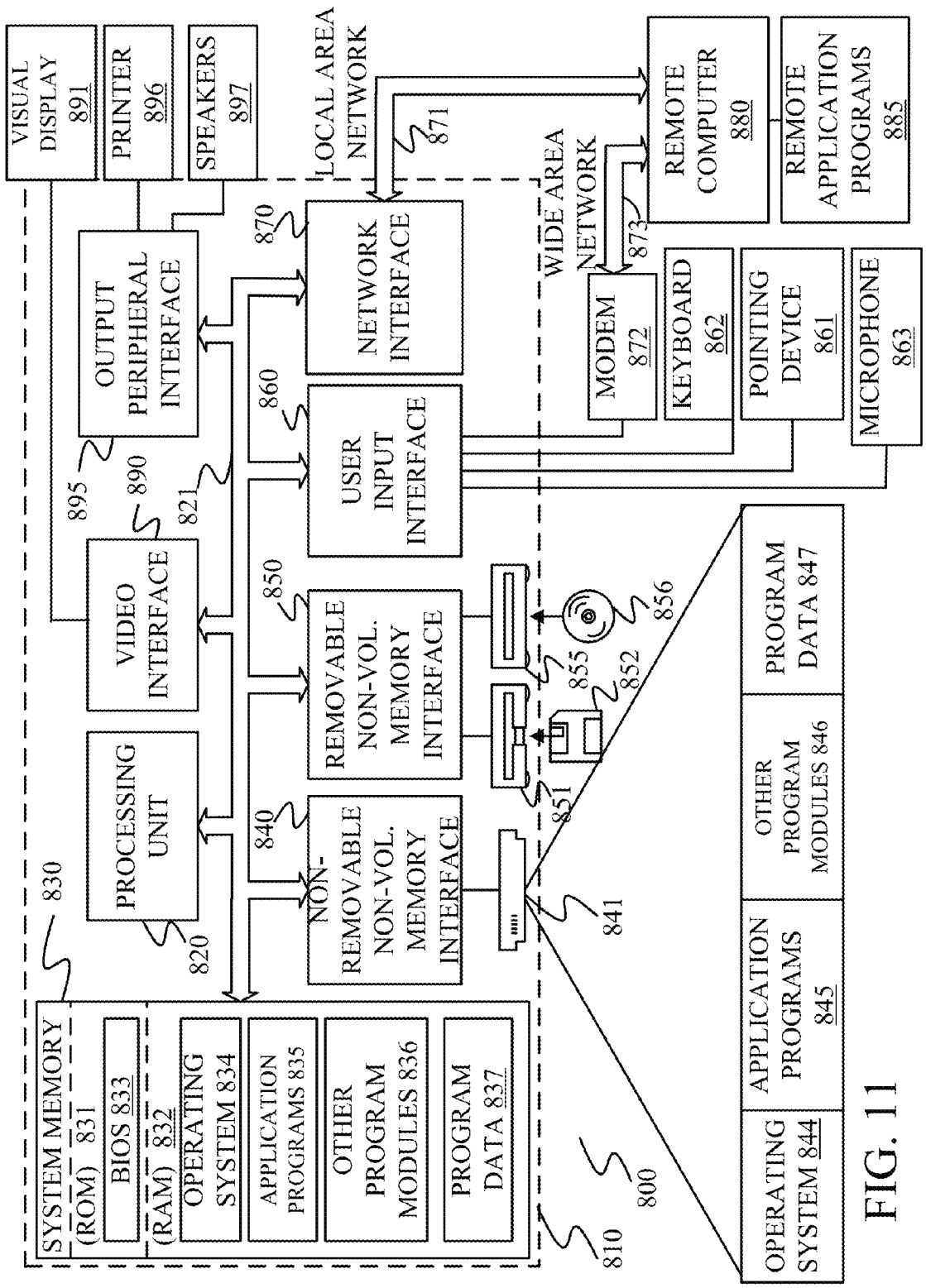
FIG. 11 is a block diagram of one illustrative computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 130, 132 or 154), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of collecting content into a collection, comprising:
    generating a user interface display that receives a librarian selection user input selecting an automated librarian component to identify and add content to the collection;
    receiving an indication of an increasing content addition frequency with which the automated librarian component is to add content to the collection;
    adding user-identified content to the collection;
    adding librarian-identified content to the collection based on the increasing content addition frequency, wherein the librarian-identified content is identified by the automated librarian component using a computer processor based on the user-identified content added to the collection; and
    generating a content display that displays the content in the collection to indicate whether the content is user-identified content or librarian-identified content.

2. The computer-implemented method of claim 1, wherein the indication of the increasing content addition frequency comprises a frequency setting user input received through the user interface display, and wherein adding the librarian-identified content comprises:
    identifying a subject matter of the user-identified content added to the collection; and
    identifying the librarian-identified content, with the automated librarian component, based on the subject matter of the user-identified content added to the collection.

3. The computer-implemented method of claim 1 wherein receiving a frequency setting user input comprises:
    receiving a frequency setting that sets the content addition frequency relative to a user content addition frequency, the user content addition frequency comprising a frequency with which the user adds content to the collection.

4. The computer-implemented method of claim 1 wherein receiving a frequency setting user input comprises:
    receiving a frequency setting that sets the content addition frequency relative to a duration since the automated librarian component was selected by the user.

5. The computer-implemented method of claim 1 wherein adding librarian-added content comprises:
    receiving a duration user input indicative of a duration over which content is to be added to the collection; and
    adding the librarian-identified content to the collection for the duration.

6. The computer-implemented method of claim 1 wherein adding the librarian-added content to the collection, comprises:
    receiving a specificity user input that defines specificity criteria indicative of a specificity of subject matter of the librarian-identified content; and
    identifying the librarian-identified content based on search criteria and the specificity criteria, the specificity criteria being separate from the search criteria.

7. The computer-implemented method of claim 1 wherein generating the content display comprises:
    identifying a target language for the content in the collection;
    translating the content in the collection from a source language in which the content is identified to the target language; and
    displaying the content in the collection in the target language.

8. The computer-implemented method of claim 1 wherein adding librarian-identified content to the collection, comprises:
    accessing a set of priority metrics;
    prioritizing the librarian-identified content based on the priority metrics; and
    adding only librarian-identified content having a priority that meets a priority threshold to the collection.

9. The computer-implemented method of claim 1 wherein generating the content display comprises:
    identifying connections between items of the content in the collection and between items of the content in the collection and the user; and
    displaying the connections.

10. The computer-implemented method of claim 1 wherein generating the content display comprises:
    automatically sorting the content in the collection into categories;
    generating an affinity diagram for the content in the collection; and
    displaying the affinity diagram.

11. The computer-implemented method of claim 1 wherein the user-identified content comprises a first set of content items and the librarian-identified content comprises a second set of content items, and wherein the content display simultaneously displays the first and second sets of content items, and visually indicates each content item as being either user-identified content or librarian-identified content.

12. The computer-implemented method of claim 11 wherein the content display displays the first and second sets of content items in a plurality of groups, each group comprising a different type of content.

13. A content collection system that collects content into a collection, comprising:

a user interface component configured to:
  generate a user interface display for display to a user;
  receive a librarian selection user input through the user interface display that selects an automated librarian component; and
  receive a rate setting user input indicative of a content addition rate with which the automated librarian component is to add content to the collection, wherein the content addition rate is defined relative to at least one of:
    a user content addition rate that represents a rate at which the user adds user-identified content to the collection; or
    a duration since the automated librarian component was selected by the user; and
  wherein the automated librarian component is configured to identify and add content to the collection using a computer processor, wherein the automated librarian component identifies and adds content to the collection at a plurality of different times based on the content addition rate, and wherein the user interface display component displays the content in the collection to indicate whether the content is user-identified content or librarian-identified content.

14. The content collection system of claim 13 wherein the user interface component generates a frequency user interface display that receives a frequency user input indicative of a frequency of addition with which the automated librarian component adds content to the collection, the automated librarian component accessing the frequency user input and adding content to the collection at the frequency of addition.

15. The content collection system of claim 13, wherein the rate setting user input defines the content addition rate relative to the user content addition rate.

16. A computer-implemented method, comprising:
  generating a user interface display that receives a librarian selection user input selecting an automated librarian component to identify and add content to the collection;
  adding user-identified content to the collection;
  identifying a subject matter area of the collection;
  identifying user information indicative of a level of user knowledge about the subject matter area;
  identifying librarian-identified content, with the automated librarian component using a computer processor, based on the level of user knowledge about the subject matter area;
  adding the librarian-identified content, identified by the automated librarian component, to the collection; and
  displaying the content in the collection and indicating whether portions of the content are user-identified content or librarian-identified content.

17. The computer-implemented method of claim 16, and further comprising:
  receiving search criteria, based on a user input, for adding content to the collection, wherein the user information is separate from the search criteria.

18. The computer-implemented method of claim 16, wherein the level of user knowledge is determined based on at least one of:
  the user-identified content added to the collection;
  a content accessing history corresponding to the user; or
  a social graph corresponding to the user.

19. The computer-implemented method of claim 16, wherein the user information comprises reading level information indicative of user reading level, and wherein identifying the librarian-identified content comprises identifying the librarian-identified content based on the reading level information.

20. The computer-implemented method of claim 16, wherein the subject matter area of the collection is identified by at least one of:
  receiving a user input that defines the subject matter area; or
  analyzing the user-identified content added to the collection.

* * * * *